(12) United States Patent
Ouyang

(10) Patent No.: US 8,330,064 B2
(45) Date of Patent: Dec. 11, 2012

(54) KEY BUTTON MECHANISM AND ELECTRONIC DEVICE USING THE SAME

(75) Inventor: Zhi-Bin Ouyang, Shenzhen (CN)

(73) Assignees: Shenzhen Futaihong Precision Industry Co., Ltd., Shenzhen (CN); FIH (Hong Kong) Limited, Kowloon (HK)

( * ) Notice: Subject to any disclaimer, the term of this patent is extended or adjusted under 35 U.S.C. 154(b) by 372 days.

(21) Appl. No.: 12/791,065

(22) Filed: Jun. 1, 2010

(65) Prior Publication Data

US 2011/0226598 A1    Sep. 22, 2011

(30) Foreign Application Priority Data

Mar. 16, 2010 (CN) .......................... 2010 1 0124733

(51) Int. Cl.
*H01H 13/14* (2006.01)
*H01H 3/12* (2006.01)

(52) U.S. Cl. ....................................... 200/341; 200/345

(58) Field of Classification Search .................. 200/341, 200/329–332, 342–345, 339, 553
See application file for complete search history.

(56) References Cited

U.S. PATENT DOCUMENTS 5,336,860 A * 8/1994 Slocum ...................... 200/332.1
6,809,273 B2 * 10/2004 Ito et al. .......................... 200/5 R

* cited by examiner

*Primary Examiner* — Renee S Luebke
*Assistant Examiner* — Lheiren Mae Caroc
(74) *Attorney, Agent, or Firm* — Altis Law Group, Inc.

(57) ABSTRACT

A key button mechanism mounted to a housing of an electronic device, comprises a key body and an actuator. The key body is mounted to the housing, the key body has a contacting portion protruding therefrom. The actuator has a resisting portion and a driving portion protruding from an end of the resisting portion. The actuator is rotatably mounted to the housing and the resisting portion is aligned with the contacting portion such that when the key body is operated, the contacting portion pushes the resisting portion to make the driving portion touch the printed circuit board.

18 Claims, 5 Drawing Sheets

KEY BUTTON MECHANISM AND ELECTRONIC DEVICE USING THE SAME

BACKGROUND

1. Technical Field

This disclosure relates to key button mechanisms, particularly relates to key button mechanisms used in a portable electronic device.

2. Description of Related Art

Many portable electronic devices such as mobile phones, have housings with an interior compartment for receiving a printed circuit board (PCB) therein. The mobile phones usually include a key button mechanism on an outer sidewall of the housing, so that user can operate the mobile phone with just one finger. However, typical key button mechanisms have a poor finger touch.

Therefore, there is a room for improved in the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the exemplary housing and method making the housing. Moreover, in the drawings like reference numerals designate corresponding parts throughout the several views. Wherever possible, the same reference numbers are used throughout the drawings to refer to the same or like elements of an embodiment.

DETAILED DESCRIPTION

For illustrative purposes, the device is an electronic device such as a mobile phone. The mobile phone described herein is a representation of the type of wireless communication device that may benefit from the present disclosure. However, it is to be understood that the present disclosure may be applied to any type of hand-held or portable device including, but not limited to, the following devices: cordless phones, paging devices, personal digital assistants, portable computers, pen-based or keyboard-based handheld devices, remote control units, portable media players that have wireless communication capability and the like. Accordingly, any reference herein to the radiotelephone should also be considered to apply equally to other portable wireless electronic devices.

Figure 1:
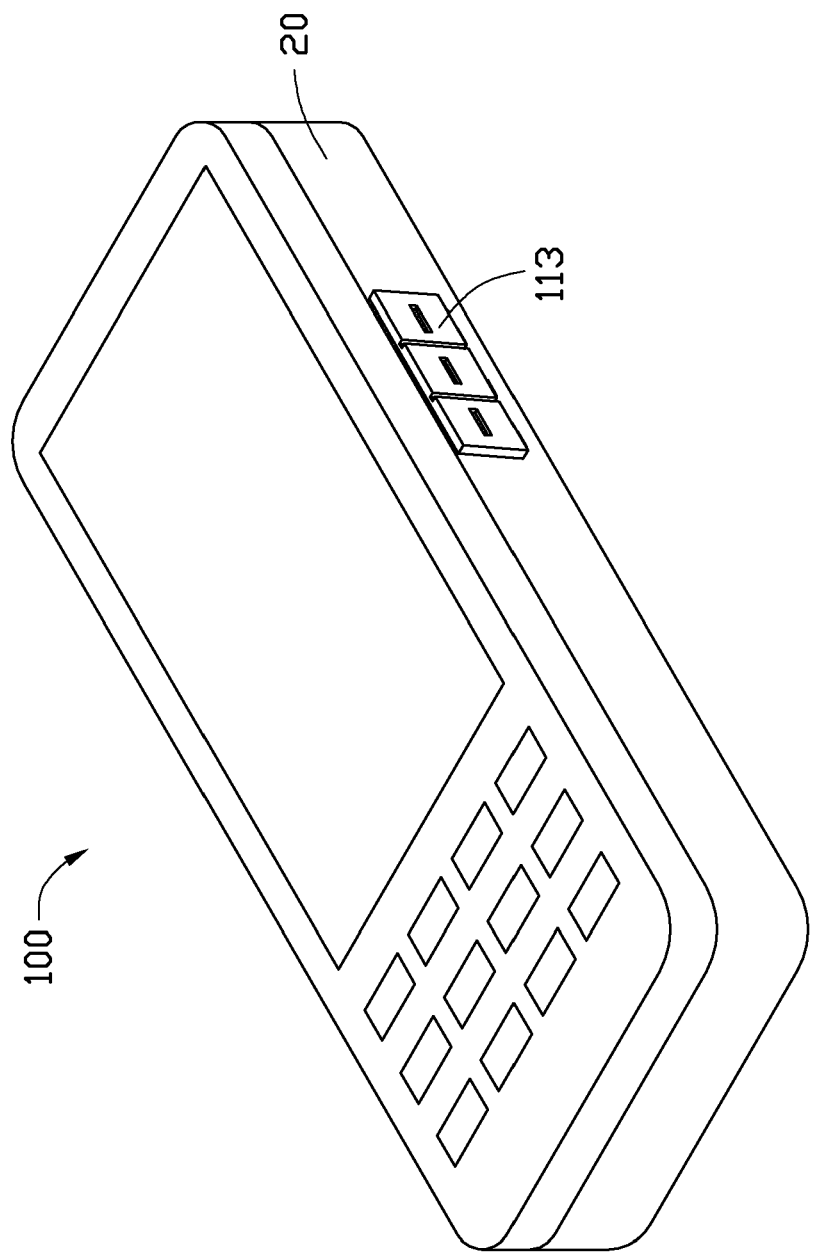
FIG. 1 is an assembled view of an electronic device including a housing and an exemplary key button mechanism.
Figure 2:
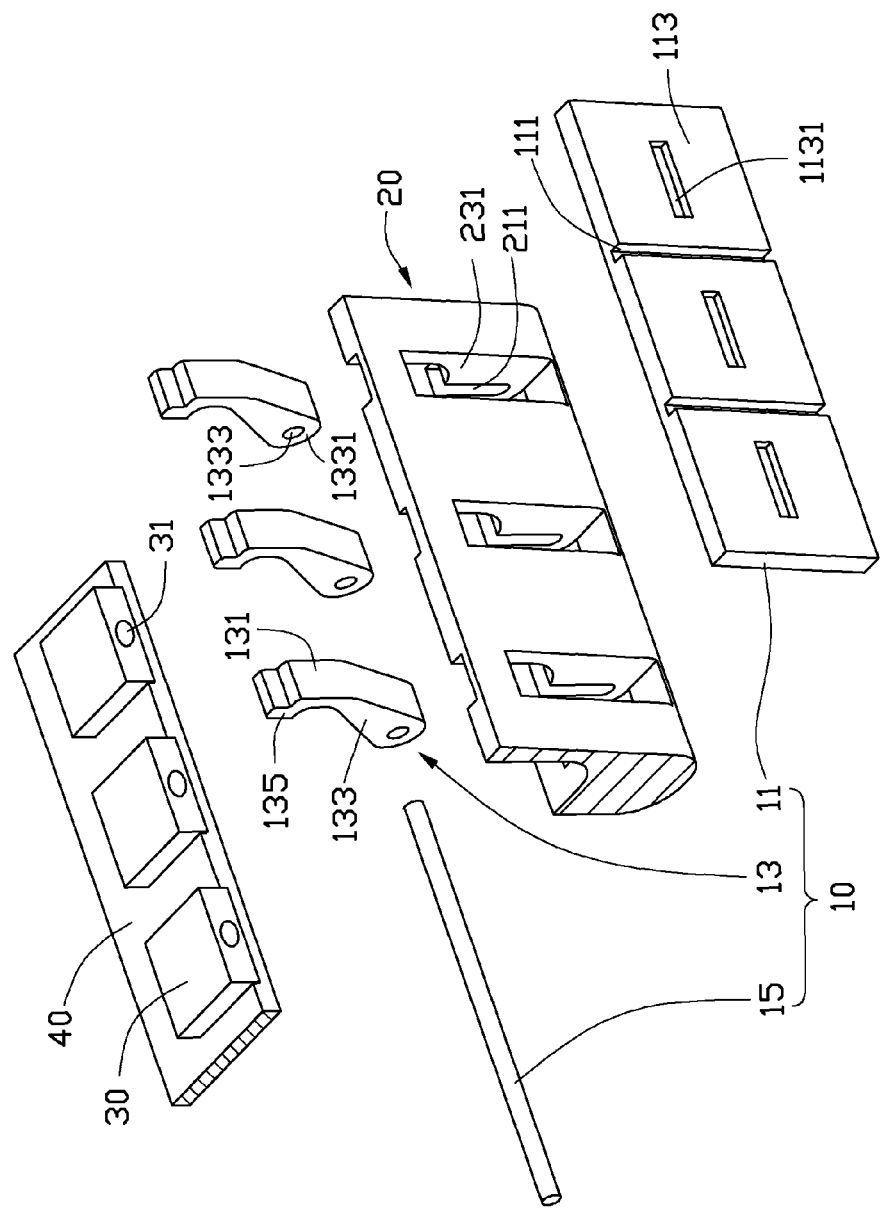
FIG. 2 is an exploded view of the electronic device shown in FIG. 1, but showing a portion of the housing.
Figure 3:
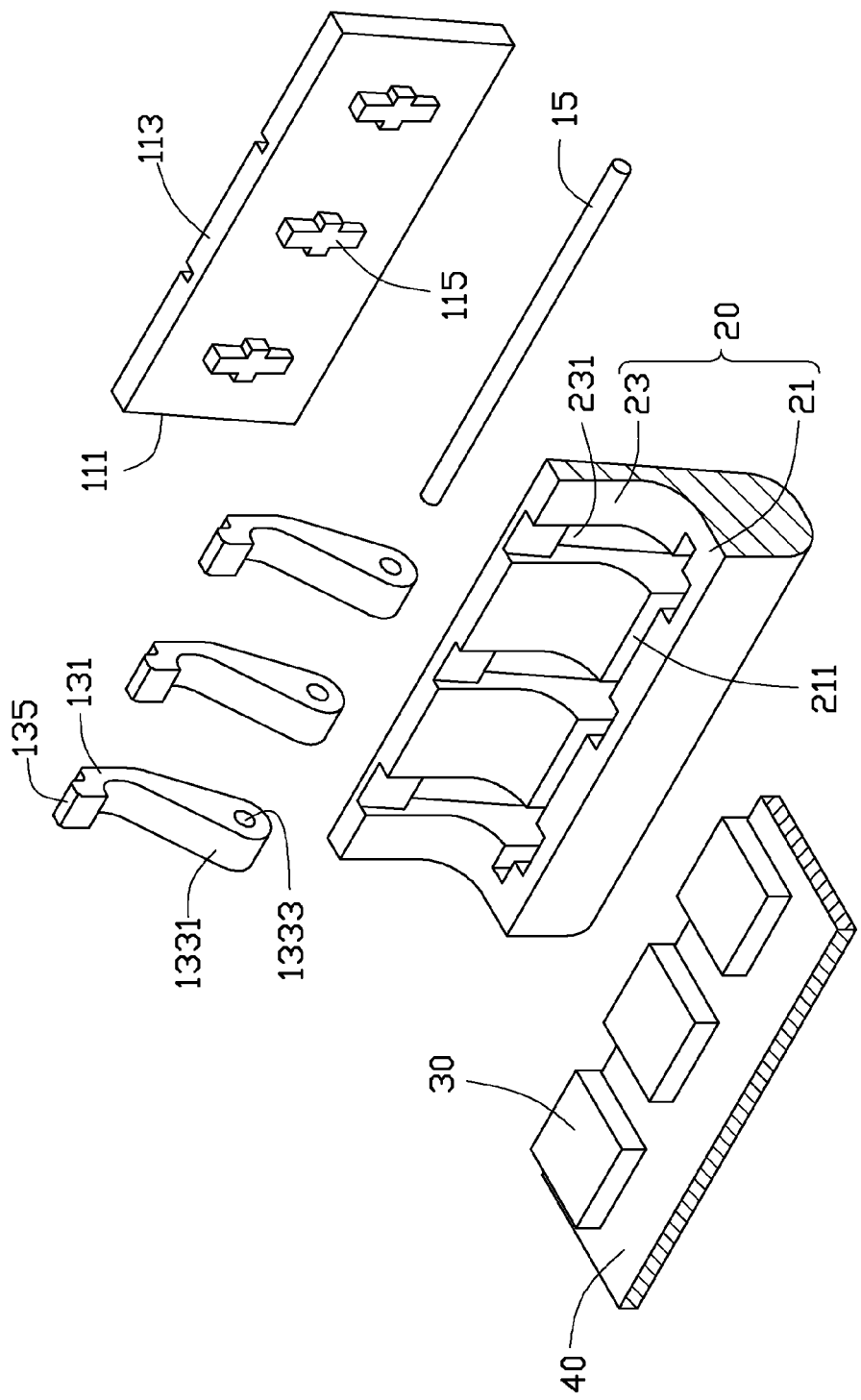
FIG. 3 is similar to FIG. 2, but showing the electronic device in another aspect.

An exemplary embodiment of an electronic device 100 incorporating a key button mechanism 20 is shown in FIG. 1-3. FIG. 1 illustrates an assembled view of the electronic device 100. FIG. 2 illustrates an exploded view of the portion of the electronic device. FIG. 3 illustrates another exploded view of the portion of the electronic device.

The exemplary electronic device 100 includes a housing 10, the key button mechanism 20, a printed circuit board (PCB) 40 and one or more switches 30, each switch 30 having a dome 31 formed thereon. The housing 20 includes a main body 21 and a sidewall 23, which connects to the main body 21. The PCB 40 is mounted to main body 21 of the housing 20, and the switches 30 are spacedly mounted to the PCB 40 with the domes 31 facing the sidewall 23. The housing 20 also includes a mounting groove 211 defined in the main body 21 and one or more space-apart openings 231 defined through the sidewall 23. Each opening 231 communicates with the mounting groove 211 and is aligned with one of the switches 30. The mounting groove 211 for mounting the key button mechanism 10 on the housing 20.

The key button mechanism 10 includes a key body 11 mounted to an outer surface of the housing 20 (such as by hot-melting), one or more actuators 13 rotatably mounted in mounting groove 211 and located near an inner surface of the housing 20, and a shaft 15 for rotatably mounting the actuators 13 to the mounting groove 211. The key body 11, in this embodiment, includes one or more key portions 113 located side by side, and each two neighboring key portions 113 may have a slot 111 defined therebetween. The key body 11 may be made of soft resin, such as polyethylene terephthalate, such that the key body 11 can be deformed under an exterior force exerted on the key body 11. The slots 111 defined between two adjacent key portions 113 make it easier for the key portions 113 to deform when an exterior force is exerted on a portion of the key body 11.

A contacting portion 115 is formed on an inside surface of each key portion 113. When the key body 11 is mounted to the housing 20 as shown in FIG. 5, each contacting portion 115 is aligned with a corresponding actuator 13.

A user can apply manual force to the key portions 113 to cause corresponding contacting portions 115 of the key body 11 to move toward the actuators 13 until the actuators 13 resist the switches 30 on the PCB 40. Thus, the PCB 40 in the housing 20 can be actuated. Indentations 1131 may be positioned at a location on an opposite surface of the key body 11 corresponding to the contacting portions 115 so the user can see an optimal location for pressing the key body 11. <this feature is optional>

Each actuator 13 is substantially C-shaped, which includes a resisting portion 131, a retaining portion 133 positioned one end of the resisting portion 131, and a driving portion 135 positioned another end of the resisting portion 131. The resisting portions 131 are aligned with respective contacting portions 115 when the actuators 13 are located as shown in FIG. 5. Each actuator 13 has a hole 1333 defined through its retaining portion 133, and the shaft 15 is rotatably inserted into the holes 1333, and the shaft 15 is then mounted in the mounting groove 211 thereby rotatably mounting the actuators 13 to the housing 20. The driving portions 135 are respectively aligned with their respective domes 31 when the actuators 13 are located in the mounting groove 211o as shown in FIG. 5.

Figure 4:
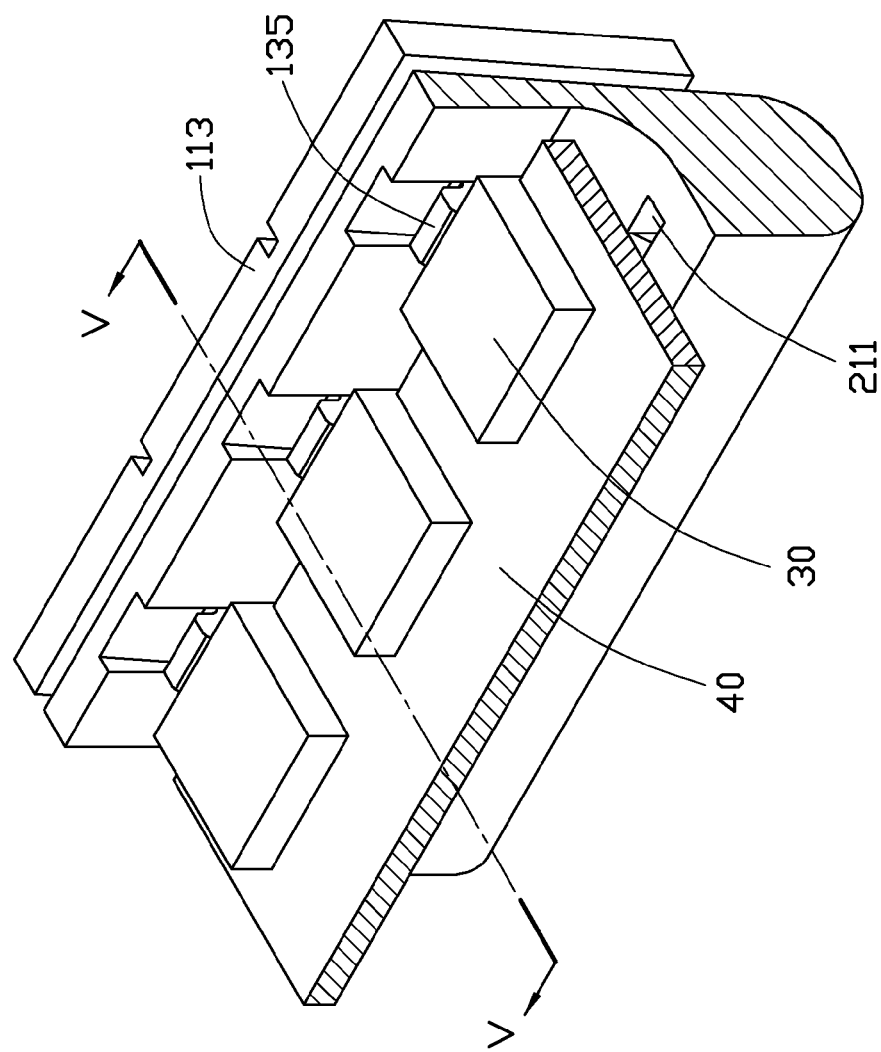
FIG. 4 is an assembled view of the portion of the housing and the key button mechanism shown in FIG. 3.
Figure 5:
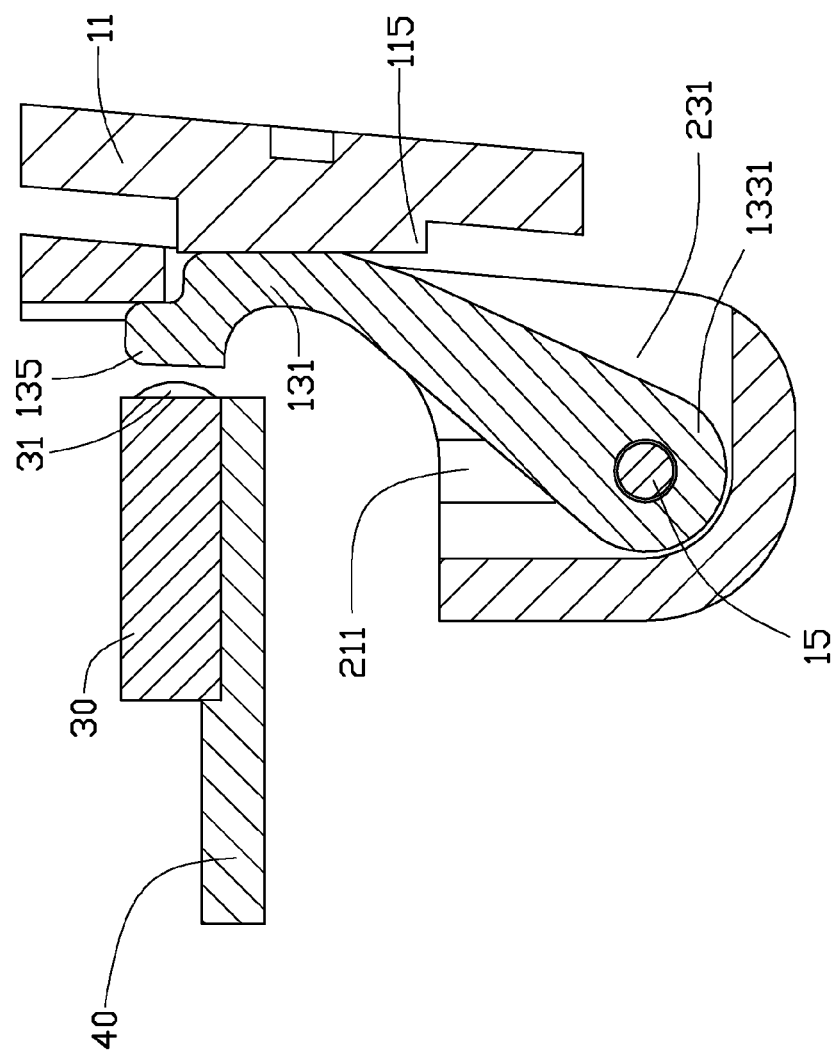
FIG. 5 is a cross-sectional view of the portion of the electronic device shown in FIG. 4.

Referring to FIGS. 3-5, in assembly, the shaft 15 is first inserted into the holes 1333 to rotatably mount the actuators 13 on the shaft 15. The shaft 15 is then retained (e.g., hot-melted) in the mounting groove 211. The resisting portions 131 of the actuators 13 are accommodated in corresponding openings 231 and the resisting portions 131 of the actuators 13 resist the inner surface of the sidewall 23 of the housing 20 to prevent the actuators 13 and the housing 20 from separation. The switches 30 are mounted to the PCB 40 and the PCB 40 is then mounted to the main body 21 of the housing 20. The domes 31 of the switches 30 are aligned with their respective resisting portions 131. Finally, the key body 11 is mounted to the outside surface of the sidewall 23, the contacting portions 115 are aligned with their respective resisting portions 131, thereby yielding an assembled device 100.

Referring to FIG. 5, in use, a user can push one of the key portions 113 or indentations 1131 so its corresponding contact portion 115 moves toward and drives its corresponding resisting portion 131, to push the corresponding driving portion 135 to actuate a corresponding dome 31 on the PCB 40. Thus, an electronic signal for electronic device 100 is generated.

It is to be understood, however, that even through numerous characteristics and advantages of the exemplary invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A key button mechanism for use in an electronic device, the electronic device including a housing and a printed circuit board, the key button mechanism comprising:
    a key body adapted for being mounted to the housing, the key body having a contacting portion protruding therefrom; and
    an actuator having a resisting portion and a driving portion protruding from an end of the resisting portion, the actuator rotatably mounted to the housing and the resisting portion aligned with the contacting portion; wherein when the key body is pressed, the contacting portion pushes the resisting portion to make the driving portion touch the printed circuit board; and
    wherein the actuator further includes a retaining portion protruding from another end of the resisting portion, and the retaining portion is rotatably mounted to the housing.

2. The key button mechanism as claimed in claim 1, wherein the key button mechanism further includes a shaft, the shaft rotatably passing through the retaining portion and the housing to mount the actuator to the housing.

3. The key button mechanism as claimed in claim 1, wherein the resisting portion resists against the housing to prevent the actuator and the housing from separation.

4. An electronic device, comprising:
    a housing;
    a printed circuit board having a switch mounted thereon; and
    a key button mechanism comprising:
        a key body mounted to the housing, the key body having a contacting portion protruding therefrom; and
        an actuator having a resisting portion and a driving portion protruding from one end of the resisting portion, the actuator being rotatably mounted to the housing and the resisting portion being aligned with the contacting portion;
    wherein when the key body is pressed, the contacting portion pushes the resisting portion to make the driving portion touch the switch; and
    wherein the actuator further includes a retaining portion protruding from another end of the resisting portion, and the retaining portion is rotatably mounted to the housing.

5. The electronic device as claimed in claim 4, wherein, the key button mechanism further includes a shaft; the shaft passing through the retaining portion and the housing to rotatably mount the actuator to the housing.

6. The electronic device as claimed in claim 5, wherein the housing includes a mounting groove defined therein; the shaft is mounted in the mounting groove.

7. The electronic device as claimed in claim 6, wherein the actuator has a hole defined through the retaining portions, and the shaft is rotatably inserted into the hole.

8. The electronic device as claimed in claim 6, wherein the housing further includes an opening defined therethrough and communicating with the mounting groove; the resisting portion of the actuator is accommodated in the opening.

9. The electronic device as claimed in claim 4, wherein the key body is mounted to an outer surface of the housing, the actuator is rotatably mounted to an inner surface of the housing.

10. An electronic device, comprising:
    a housing;
    a printed circuit board having at least one switch mounted thereon; and
    a key button mechanism comprising:
        a key body mounted to the housing, the key body having at least one contacting portion protruding therefrom, and
        at least one actuator mounted to the housing between the key body and at least one switch, each actuator having a resisting portion, a driving portion protruding from one end of the resisting portion, and a retaining portion protruding from another end of the resisting portion;
    wherein each resisting portion is respectively aligned with a contacting portion, each retaining portion rotatably mounted to the housing, one side of each driving portion resists against the housing to prevent each actuator and the housing from separation, another side of each driving portion faces the switch on the printed circuit board.

11. The electronic device as claimed in claim 10, wherein the key button mechanism further includes a shaft; the shaft rotatably passing through the retaining portion to mount the at least one actuator to the housing.

12. The electronic device as claimed in claim 11, wherein the housing includes a mounting groove defined therein; the shaft is mounted in the mounting groove.

13. The electronic device as claimed in claim 12, wherein each actuator has a hole defined through the retaining portions, and the shaft is rotatably inserted into the hole.

14. The electronic device as claimed in claim 11, wherein the housing further includes at least one opening defined therethrough and communicating with the at least one mounting groove; the resisting portion of each actuator is respectively accommodated in an opening.

15. The electronic device as claimed in claim 10, wherein the key body is mounted to an outer surface of the housing, each actuator is rotatably mounted to an inner surface of the housing.

16. The electronic device as claimed in claim 10, wherein the key body includes at least two key portions located side by side, and the two key portions have a slot defined therebetween; the slot allowing the at least two key portions to more easily deform when an exterior force is exerted on the key body.

17. The electronic device as claimed in claim 10, wherein the key body is made of soft resin.

18. The electronic device as claimed in claim 17, wherein the soft resin is polyethylene terephthalate.

* * * * *